US009391631B1

(12) United States Patent
Thompson et al.

(10) Patent No.: US 9,391,631 B1
(45) Date of Patent: Jul. 12, 2016

(54) PROCESSING SYSTEM WITH ENCODING FOR PROCESSING MULTIPLE ANALOG SIGNALS

(71) Applicant: RAYTHEON COMPANY, Waltham, MA (US)

(72) Inventors: Daniel Thompson, El Segundo, CA (US); Harry Marr, Manhattan Beach, CA (US); Francisco Romero, Anchorage, AK (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/606,391

(22) Filed: Jan. 27, 2015

(51) Int. Cl.
*H03M 1/12* (2006.01)

(52) U.S. Cl.
CPC .................................. *H03M 1/1245* (2013.01)

(58) Field of Classification Search
CPC ......... H03M 3/34; H03M 3/464; H03M 3/40; H03M 3/424; H03M 3/069; H03M 3/143; H03M 3/285; H03M 1/0665; H03M 5/145; H03M 7/42; H03M 7/165; H03M 1/1245
USPC .................................................. 341/130–160
See application file for complete search history.

(56) References Cited

U.S. PATENT DOCUMENTS

| | | | | |
|---|---|---|---|---|
| 3,586,148 A * | 6/1971 | Jacobson | ................... | B41J 5/08 178/17 C |
| 3,596,181 A * | 7/1971 | Dowling | .............. | H04B 10/112 178/17 C |
| 3,768,094 A * | 10/1973 | Henrich | ............... | G01D 5/2013 235/449 |
| 4,015,253 A * | 3/1977 | Goldstein | ............. | H03M 1/308 116/257 |
| 4,037,219 A * | 7/1977 | Lewis | ..................... | H03M 1/00 250/231.15 |
| 4,644,322 A * | 2/1987 | Fujita | ...................... | H03M 1/00 341/159 |
| 5,091,643 A * | 2/1992 | Okutani | ................ | H03M 1/069 250/231.14 |
| 5,155,489 A * | 10/1992 | Gulczynski | ........... | H03M 7/165 341/106 |
| 5,216,423 A * | 6/1993 | Mukherjee | .............. | H03M 7/42 341/106 |
| 6,310,832 B1 | 10/2001 | Kits van Heyningen | | |
| 7,492,291 B2 * | 2/2009 | Murray | ................. | H03M 5/145 341/100 |
| 2008/0291083 A1 | 11/2008 | Chang | | |
| 2008/0292035 A1 | 11/2008 | Chang | | |
| 2009/0296666 A1 | 12/2009 | Rimini | | |

FOREIGN PATENT DOCUMENTS

| | | |
|---|---|---|
| EP | 1 122 813 A2 | 8/2001 |
| WO | WO 2008/112454 A1 | 9/2008 |
| WO | WO 2014/203249 A1 | 12/2014 |

OTHER PUBLICATIONS

Giomi et al., "System-Theoretical Analysis of Analog-CDMA Applied to Mixed-Signal Readout Interfaces for MEMS Gyroscopes," Prime, Session WF3—Readout Circuits, pp. 43-46, 2012.

(Continued)

*Primary Examiner* — Lam T Mai
(74) *Attorney, Agent, or Firm* — Lewis Roca Rothgerber Christie LLP (57) ABSTRACT

A system for converting several analog signals to digital signals using a single analog to digital converter. Each of the analog signals is encoded, using multiplication, with a different binary code, and the encoded analog signals are summed, and converted to digital form by an analog to digital converter. Multiple digital data streams are then formed from the digital output stream produced by the analog to digital converter, by forming correlations of the digital output stream with each of the binary codes.

18 Claims, 6 Drawing Sheets

(56) References Cited

OTHER PUBLICATIONS

Yamasaki et al., "A Low-Power Floating-Gate-MOS-Based CDMA Matched Filter Featuring Coupling Capacitor Disconnection," IEEE Journal of Solid-State Circuits, 42(2):422-430, Feb. 2007.
Suh, et al., "Low-Power Discrete Fourier Transform for OFDM: A Programmable Analog Approach", IEEE Transactions on Circuits and Systems I: Regular Papers, IEEE, US, vol. 58, No. 2, Feb. 1, 2011 (pp. 290-298).

Written Opinion of the International Searching Authority for International Application No. PCT/US2015/063223 filed Dec. 1, 2015, Written Opinion of the International Searching Authority mailed Mar. 7, 2016 (8 pgs.).
International Search Report for International Application No. PCT/US2015/063223, filed Dec. 1, 2015, International Search Report dated Feb. 22, 2016 and mailed Mar. 7, 2016 (5 pgs.).

\* cited by examiner

PROCESSING SYSTEM WITH ENCODING FOR PROCESSING MULTIPLE ANALOG SIGNALS

BACKGROUND

1. Field

One or more aspects of embodiments according to the present invention relate to converting analog signals to digital signals, and more particularly to a system and method for converting multiple streams of analog to digital signals using a single analog to digital converter.

2. Description of Related Art

In various applications, including beam forming for array antennas, it is useful to convert several streams of analog data to digital data. Potential commercial applications include applications in beam forming for cellular phone antennas, either on cellular network towers or on cellular mobile telephones, and in beam forming for commercial satellite communications. Using a separate analog-to-digital converter for each data stream may be costly, both in terms of the cost of the parts and in terms of power consumption. Thus, there is a need for a system and method for converting multiple streams of analog signals to digital signals using fewer analog to digital converters than there are analog streams, such as using a single analog to digital converter to convert all analog streams.

SUMMARY

Aspects of embodiments of the present disclosure are directed toward a system for converting several analog signals to digital signals using a single analog to digital converter. Each of the analog signals is encoded, using multiplication, with a different binary code, and the encoded analog signals are summed, and converted to digital form by an analog to digital converter. Multiple digital data streams are then formed from the digital output stream produced by the analog to digital converter, by forming correlations of the digital output stream with each of the binary codes.

According to an embodiment of the present invention there is provided a system for processing a plurality of analog signals, the system including: a code generator including a plurality of serial digital code outputs, the code generator configured to produce, at the plurality of code outputs, a plurality of orthogonal binary codes, each of the plurality of orthogonal binary codes corresponding to one of the analog signals; a plurality of encoders, each encoder including: an analog encoder input connected to receive an analog signal of the plurality of analog signals; a digital encoder input configured to receive a binary encoder input signal, the digital input connected to a code output of the code generator; an analog encoder output for transmitting an analog encoder output signal; and a circuit configured to generate the analog encoder output signal by: multiplying the analog signal received at the analog encoder input by a first analog value when the binary encoder input signal has a first digital value, and multiplying the analog signal received at the analog encoder input by a second analog value when the binary encoder input signal has a second digital value; and a summing node having a plurality of analog summing inputs and an analog sum output, each analog summing input connected to the analog encoder output of an encoder of the plurality of encoders, the summing node configured to produce a signal, at the analog sum output, equal to the sum of the signals at the analog summing inputs.

In one embodiment, the system includes: an analog to digital converter (ADC) including an analog ADC input connected to the analog sum output and a digital ADC output; and a decoder, including a digital decoder input connected to the digital ADC output and a plurality of digital decoder outputs, a first decoder output of the plurality of decoder outputs configured to produce a first decoder output signal, the first decoder output signal being the correlation between the signal at the digital decoder input and a first binary code of the plurality of orthogonal binary codes.

In one embodiment, the system includes a beam former having a plurality of analog inputs and an analog output, the analog output being connected to an analog encoder input, the beam former being configured to generate, at the analog output, a signal equal to a linear combination of the signals at the analog inputs of the beam former.

In one embodiment, the beam former includes a plurality of multiplying digital to analog converters.

In one embodiment, the beam former includes a plurality of floating gate metal oxide semiconductor transistors.

In one embodiment, the system includes an analog sample and hold circuit having an analog input and an analog output, the analog output of the analog sample and hold circuit being connected to an analog input of the plurality of analog inputs of the beam former.

In one embodiment, the system includes a down-converter having an RF input and an IF output, the IF output being connected to the analog input of the analog sample and hold circuit.

In one embodiment, the system includes an antenna element having an RF output, the RF output of the antenna element being connected to the RF input of the down-converter.

In one embodiment, the analog sample and hold is configured to operate at a first sampling rate, and the code generator is configured to operate at a second sampling rate, the second sampling rate being greater than the first sampling rate.

In one embodiment, the ratio of the second sampling rate to the first sampling rate is equal to the number of encoders in the plurality of encoders.

In one embodiment, the code generator includes a linear feedback shift register.

In one embodiment, the code generator includes a memory, the memory storing a plurality of codes.

In one embodiment, the decoder is configured to form the correlation between the signal at the digital decoder input and the first binary code by multiplying the signal at the digital decoder input by the binary code to produce a digital multiplier output stream.

In one embodiment, the decoder is configured, to form the correlation between the signal at the digital decoder input and the first binary code by further processing the digital multiplier output stream with a filter.

In one embodiment, the filter is a moving average filter.

In one embodiment, the moving average filter is configured to average a number of points, the number of points being equal to the number of encoders in the plurality of encoders.

In one embodiment, the first value is 0 and the second value is 1.

In one embodiment, the first value is −1 and the second value is 1.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method and circuits for converting analog signals to digital signals provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
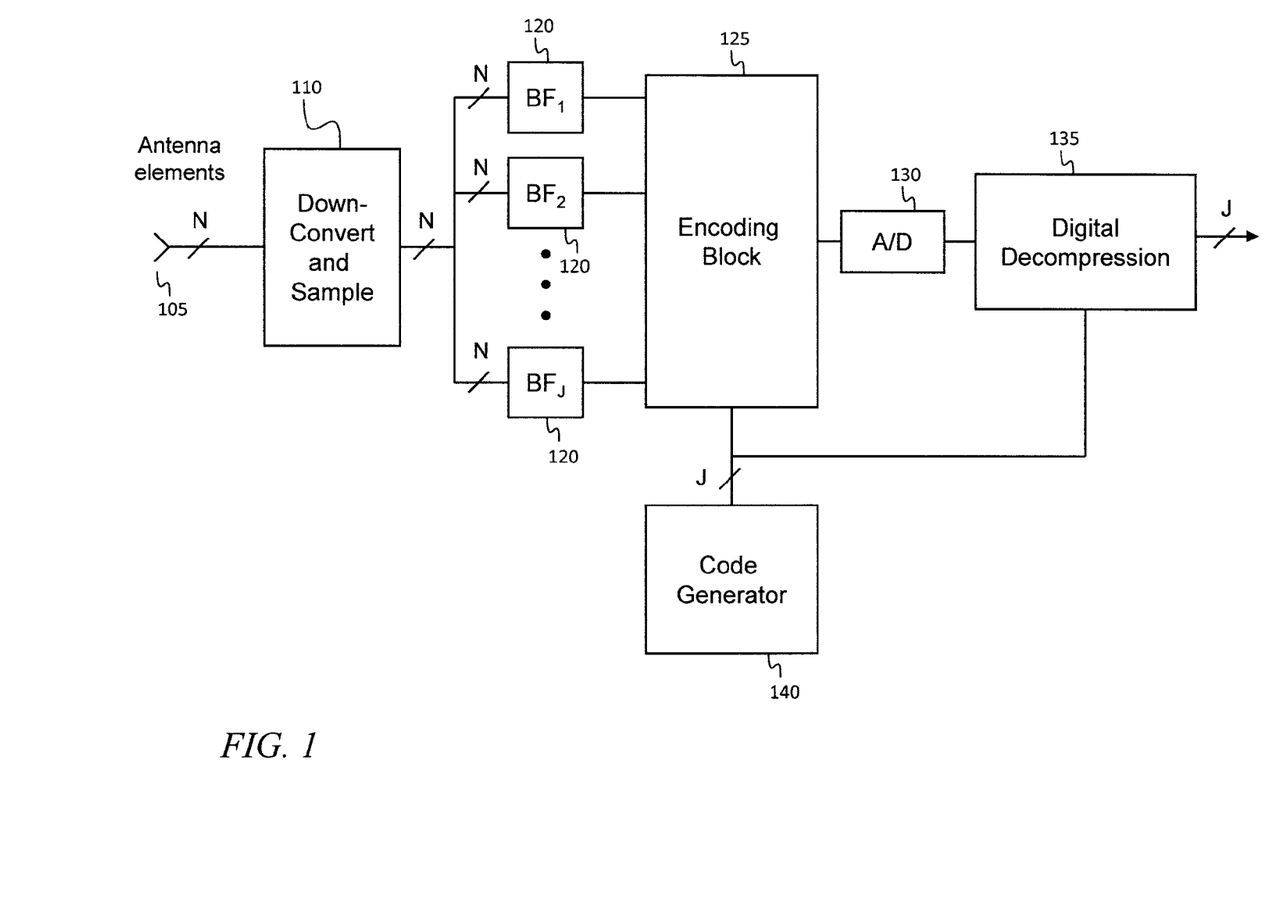
FIG. 1 is a block diagram of a receiver and beam forming system including a circuit for converting analog signals to digital signals according to an embodiment of the present invention.

Referring to FIG. 1, in one embodiment an array of receiving antenna elements 105 receives a set of analog radio frequency (RF) signals and the output of each antenna element is fed into a "down-convert and sample" block 110 for down-converting the signals and sampling each signal with an analog sample-and-hold circuit, which samples at a rate referred to herein as the beam rate, to form a set of N discrete-time analog signals. As used herein, the terms "radio frequency" and "RF" include any frequency at which an array antenna may operate and thus include microwave and millimeter-wave frequencies. The down-conversion performed in the down-convert and sample block 110 may be accomplished, for example, by mixing the RF signal down to an intermediate frequency (IF) and then sampling the IF frequency with an analog sample-and-hold circuit, or by filtering the RF signal with a bandpass filter and then down-sampling the signal, by sampling at the beam rate, where the bandwidth of the bandpass filter is chosen to be sufficiently narrow that the beam rate is at least the Nyquist rate. The output of the down-convert and sample block 110 is a set of N discrete-time analog signals. In one embodiment the down-convert and sample block 110 generates one output signal for each antenna element (i.e., the array contains N antenna elements); in another embodiment it generates two output signals, e.g., an in-phase signal and a quadrature signal for each antenna element (i.e., the array contains N/2 antenna elements). In some embodiments the signals are down converted and filtered such that the bandwidth of the signals at the input of the down-convert and sample block 110 is greater than the bandwidth of the output of the down-convert and sample block 110. In some embodiments, the analog signals are sampled directly by discrete-time sample and holds. In some embodiments, the analog signals are not sampled and are kept in continuous time.

The discrete-time analog signals are, in one embodiment, fed into a set of J beam formers 120, each of which forms a linear combination of the set of analog signals from the N antenna elements. Each linear combination may correspond, for example, to a receive beam in a particular direction, or with a particular spoiling factor. The output of each beam former 120 is known by those skilled in the art as a beam, the sum of the analog signals from multiple antenna elements. The outputs of the beam formers 120 are then combined in an encoding block 125. In the encoding block 125, each beam former output is encoded with one of a set of codes, supplied by a code generator 140, and the encoded beam former outputs are summed to form a composite encoded signal. As used herein, a "code" is a sequence of binary digits, or "bits". The code may be a pseudorandom code, it may be a repeating code with a period measured as a number of bits, and the codes in the set of codes may be orthogonal to each other.

The composite encoded signal at the output of the encoding block 125 is converted to a digital data stream by an analog to digital converter (A/D converter) 130, and then separated into a set of J digital data streams by a digital decompression block 135, or "decoder". In one embodiment, the digital decompression block 135 outputs J digital data streams, each of which is a digital representation of the discrete-time analog signal at the output of one of the beam formers 120; in another embodiment, each digital data stream at the output of the digital decompression block 135 represents a linear combination of the discrete-time analog signals at the outputs of the beam formers 120.

Figure 2:
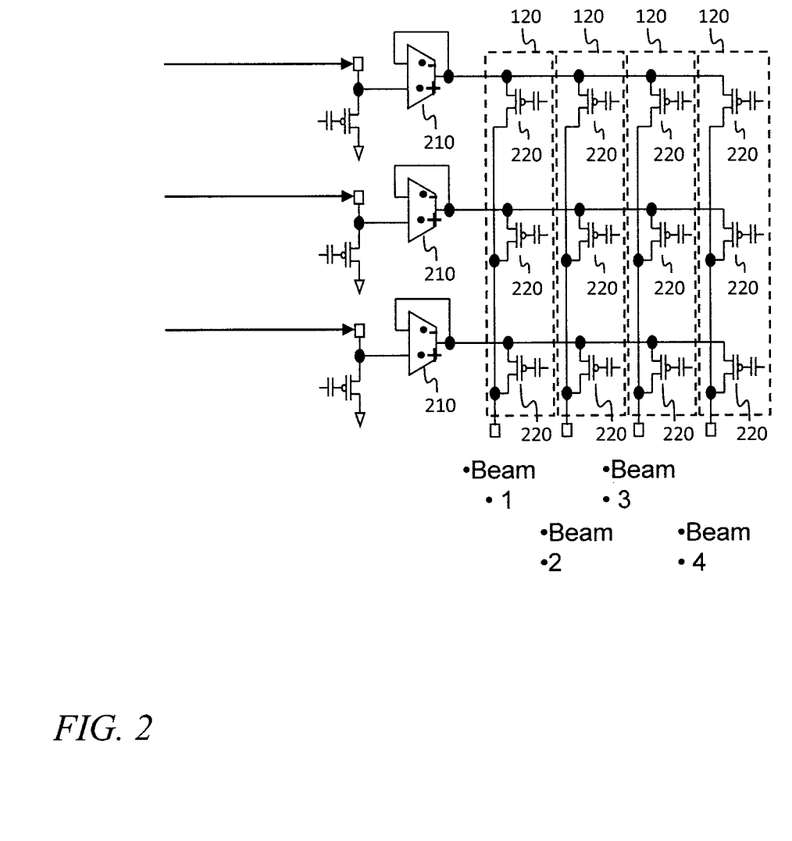
FIG. 2 is a schematic diagram of a set of four beam formers according to an embodiment of the present invention.

Referring to FIG. 2, in one embodiment a set of beam formers 120 is constructed using an array of floating gate metal-oxide semiconductor transistors (FGMOS transistors) 220. The set of beam formers 120 has N inputs (with N=3 in the embodiment of FIG. 2) and J outputs, one for each of the J beam formers 120 (with J=4 in the embodiment of FIG. 2), and each FGMOS transistor 220 implements one coefficient, e.g., the coefficient by which the $i^{th}$ input is multiplied to form a contribution to the output of the $k^{th}$ beam former 120, where i ranges from 1 to N, k ranges from 1 to J, and the current at the output of the $k^{th}$ beam former 120 is a linear combination of the signals at the N inputs. A transconductance amplifier 210 may be used at each input if the input signal is a voltage, i.e., the output of the preceding stage (the down-convert and sample block 110) is a set of voltages. In this case each FGMOS transistor 220 contributes a current to the conductor for the corresponding output, i.e., the total current at the output of the $k^{th}$ beam former 120 is the sum of the currents provided by all of the FGMOS transistors 220 connected to that output. The gate charges in the FGMOS transistors 220 may be provided at startup by a suitable beam former gate charge programming circuit, and they may be modified during operation if it is desired to change the direction or other characteristics of one or more of the beams. If the range of input voltages includes negative voltages, then a bias voltage may be added to the input voltages so that the currents through the FGMOS transistors 220 remain positive. In other embodiments the beam former 120 is implemented using an array of multiplying digital to analog converters (multiplying DACs). The use of multiplying DACs may make it possible to change the beam former coefficients rapidly, making rapid beam steering possible.

Figure 3:
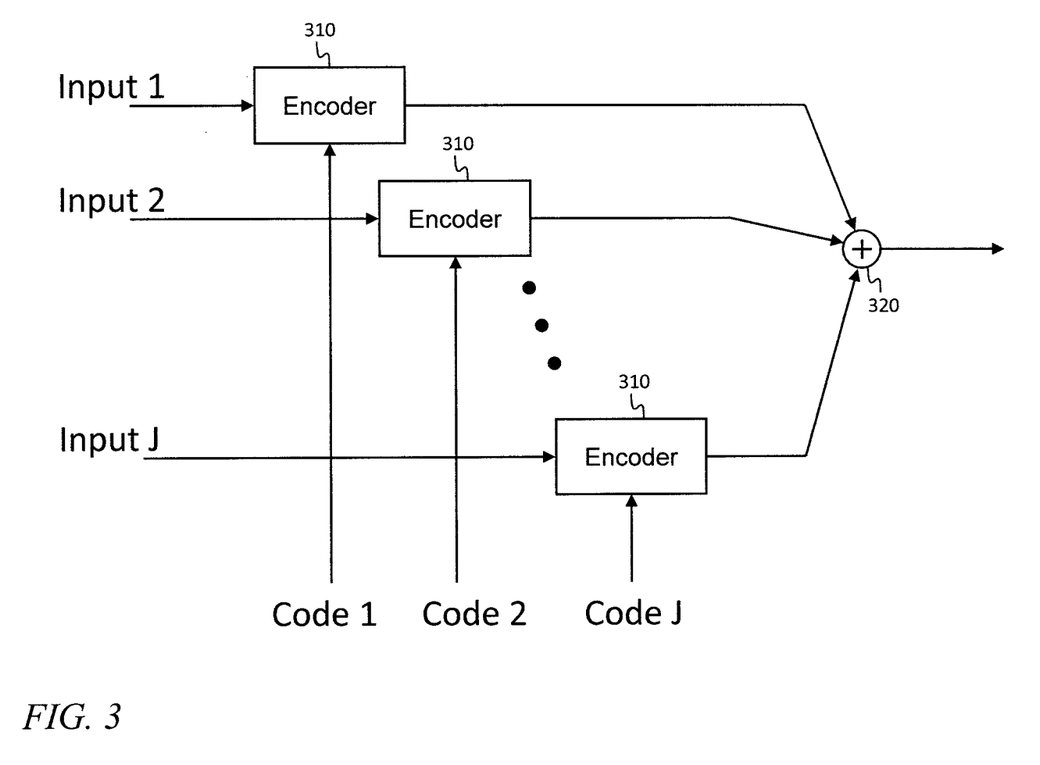
FIG. 3 is a block diagram of an encoding block according to an embodiment of the present invention.

Referring to FIG. 3, in one embodiment the encoding block 125 contains a set of encoders 310, each of which encodes the output of one of the beam formers 120 with a corresponding code, to form an encoded beam former output. The encoded beam former outputs are then summed in a summing node 320, to form a composite encoded signal. Each code input receives a serial stream of bits, each bit being one bit of a code. In one embodiment the J codes are orthogonal codes.

The encoding is performed at a rate referred to herein as the code rate, which may be higher, e.g., four times as high as, the beam rate. In this embodiment, each time the analog value at one of the inputs of the encoding block 125 is updated, it is encoded four times, with four new code bits, before the analog value is updated again. Each time the J code bits are updated, a new encoded beam former output is generated by each encoder 310 and the J encoded beam former outputs are summed to form a new composite encoded signal.

Figure 4:
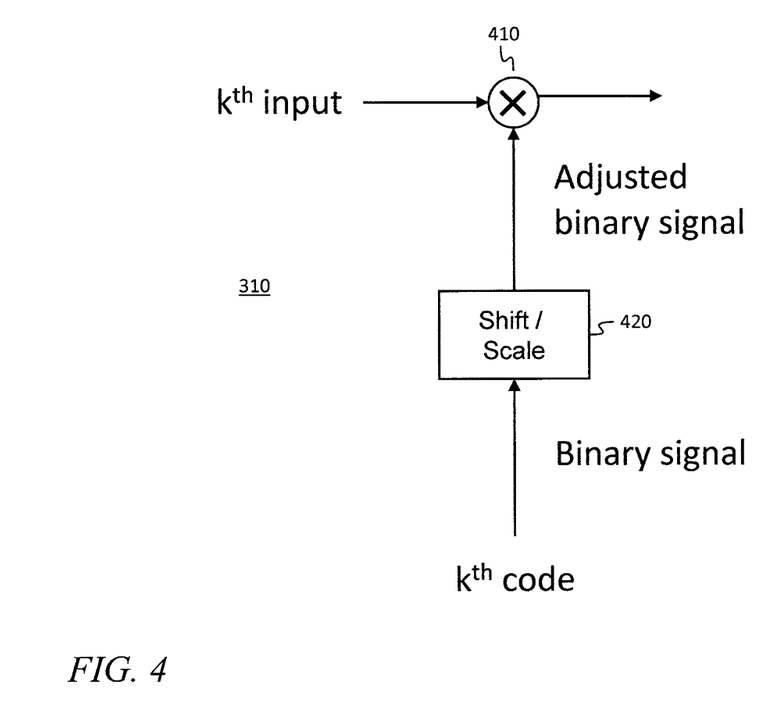
FIG. 4 is a block diagram of an encoder according to an embodiment of the present invention.

Referring to FIG. 4, in one embodiment, the encoding consists of multiplying the input to the encoder 310 (which is the output of a corresponding beam former 120), in a discrete-time multiplier 410, by one of two values for each time sample at the code rate, depending on whether the current code bit represents a binary 0 or a binary 1. The code is updated for each discrete-time sample, at the code rate. This may be accomplished, if the code bit is represented as a voltage on a conductor, by shifting and scaling the input code voltage to form an adjusted binary signal, and feeding the adjusted binary signal to the multiplier. For example, if the code input voltages are $V_L$ and $V_H$ to represent binary values of 0 and 1, respectively, then to multiply the input value by adjusted binary signal values 0 or 1, respectively, the shift and scale block 420 may subtract $V_L$ from the code voltage and multiply it by $1/(V_H-V_L)$. In another embodiment, the shifting and scaling constants are selected so that the input voltage is multiplied by −1 when the code bit is 0 and by +1 when the code bit is 1. The multiplier may be implemented, for example, as a multiplying DAC. In another embodiment, the encoder is implemented with a single-pole double-throw (SPDT) switch, fabricated using transistors, that selects between the outputs of two amplifiers, one of which multiplies the input by a first gain (e.g., −1) and the other of which multiplies the input by a second gain (e.g., +1).

Referring again to FIG. 1, the code generator 140 generates a set of J codes that are provided by the code generator 140 in J serial data streams at the J outputs of the code generator 140. The code generator 140 may include, for example, a set of J linear feedback shift registers with different initialization values so that the code each generates is orthogonal to those generated by the others. In another embodiment the codes may be stored in memory and read out in sequence as they are used. In one embodiment an orthogonal set of codes, such as Walsh codes, is used. The J code streams may be synchronized, i.e., transitions in one of the code streams may occur substantially simultaneously with transitions in the other code streams of the J code streams.

The A/D converter 130 converts each new value of the composite encoded signal as it is updated, i.e., the A/D converter 130 converts the composite encoded signal at the code rate. The digital decompression block 135 then produces J separate digital data streams from the single data stream produced by the A/D converter 130.

Figure 5:
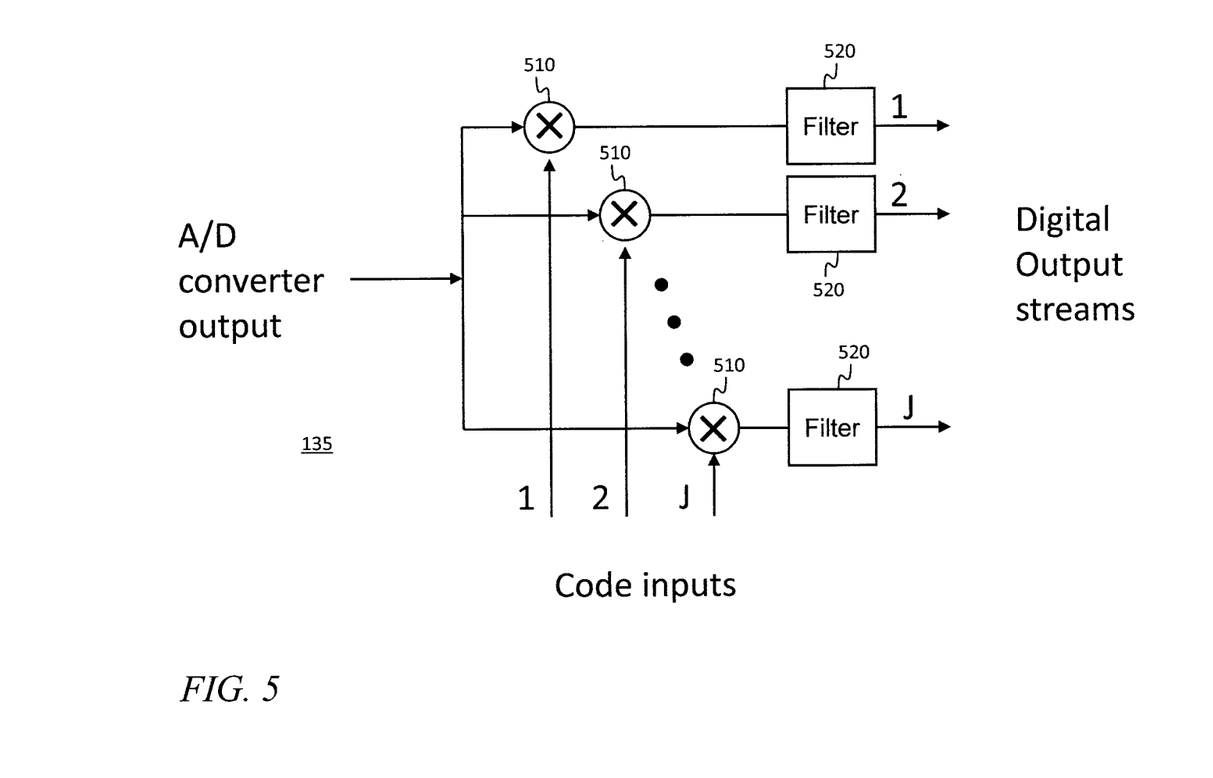
FIG. 5 is a block diagram of a digital decompression block according to an embodiment of the present invention.

Referring to FIG. 5, in one embodiment the digital decompression block 135 includes a set of J digital multipliers 510, each multiplying the input of the digital decompression block 135, which is the output of the A/D converter 130, by one of the J code streams, to generate a respective digital multiplier output stream. The code streams may be provided by the code generator (as illustrated in FIG. 1), or they may be generated separately for the digital decompression block 135, e.g., by a separate set of linear feedback shift registers or by a separate memory storing the same set of codes. Each code stream may also be mapped to a pair of numbers different from 0 and 1 before being multiplied by the input of the digital decompression block 135; for example 0 and 1 may be mapped to −1 and +1. A provision, e.g., a common system clock and a suitable synchronization system, is used to insure that the codes in the digital decompression block 135 are synchronized, with a suitable time delay, with the codes applied in the encoding block, i.e., so that when an analog sample that has been encoded with a particular code bit is converted by the A/D converter 130 and sent to the digital decompression block 135, it is then multiplied again by the same code bit (or a mapped value corresponding to the same code bit), in one of the branches of the digital decompression block 135. The output of each multiplier 510, i.e., the digital multiplier output stream, may then be filtered by a filter 520, e.g., by a moving average filter, to form a filtered digital output stream. In one embodiment, the ratio of the code rate to the beam rate is equal to the number of beams, and the number of samples averaged in the moving average filter is also equal to the number of beams. Multiplying the output of the A/D converter 130 by a code stream and filtering the product has the effect of calculating the correlation between the code stream and the output of the A/D converter 130. In one embodiment the multipliers may be absent from the embodiment shown in FIG. 5 and a cross-correlation between the A/D converter and a code may instead be formed by programming a finite impulse response filter having a tap for each bit of the code, with coefficients that are mapped values corresponding to the bits of the code.

In some embodiments, several systems such as the one illustrated in FIG. 1 may be implemented in parallel; for example, a system with 2N antenna elements may be used to generate and digitize 2J beams using two of the systems of FIG. 1. In some embodiments, portions of the system of FIG. 1 may be put to use. For example, the combination of the encoding block 125, the code generator 140, and A/D converter 130 and the digital decompression block 135 may be used in an application not involving receiving antennas or beam forming, simply to convert several analog signals to corresponding digital data streams. Such a system may have applications in instrumentation or in control systems. In another embodiment, the encoding block 125 and the code generator 140 may be put to use without the other elements of FIG. 1, to encode several analog signals. These analog signals may then be transmitted, for example, over an analog channel, and decoded by a suitable analog decoding block.

In one embodiment the digital decompression block 135 is implemented using one or more processing units. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example, a processing unit may include two processing units, an FPGA and a CPU, interconnected on a PWB.

In one embodiment the shift and scale block is configured to multiply each beam former output by −1 or +1 (depending on whether the current code bit is 0 or 1) and the digital decompression block 135 also multiplies by −1 or +1 (depending on whether the current code bit is 0 or 1). In this embodiment each of the J digital output streams may be proportional to one of the analog beam former signals, and substantially independent of the other analog beam former signals. In another embodiment the multiplication is instead by 0 or 1 in both the encoder and the digital decompression block 135, and each of the J digital output streams may be proportional to a linear combination of the J analog beam former output streams. If a digital signal corresponding to only one of the J analog beam former output streams is needed, it may then be formed by taking a suitable linear combination of the J digital output streams.

Embodiments of the present invention may be implemented using RF complementary metal-oxide semiconductor (RFCMOS) technology. Although the system and method of converting J analog signal streams to J digital signal streams using a single A/D converter has been described in the context of a beam forming application, it may be used in other applications to convert several (continuous time or discrete time) analog signals to corresponding digital signals using one A/D converter. Such applications may include a broad range of commercial application in which several analog signals are converted to digital form.

Embodiments of the present invention may make considerable power savings possible. For example, in a system with 4 analog signals (e.g., a system with 4 beam formers 120), using four 10-bit A/D converters with a bandwidth B=500 MHz, a (Nyquist) sampling rate of 1 gigabit/second (Gbps), four 1 Gbps 10-bit A/D converters may be used. Using an embodiment of the present invention with pseudorandom number (PN) encoding, 4 signals may be encoded with a single 2 Gbps 12-bit A/D converter. Power consumption may be greatly reduced because in each 1 Gbps part, much of the power consumption may result from packaging and driving off-chip input and output (I/O), so that, for example, four 1 Gbps 10-bit A/D converters may consume approximately 1.1 W each, for a total of 4.4 W. A single 2 Gbps 12-bit A/D converter, on the other hand, may only consume approximately 1.8 Watts, a reduction by a factor of more than 2.4. I/O data throughput may also be reduced, being 24 Gbps for a single 2 Gbps 12-bit A/D converter, but 40 Gbps for four 1 Gbps 10-bit A/D converters. Thus I/O power may be reduced by 40%, and the number of field-programmable gate array (FPGA) transceivers may also be reduced by 40%.

Figure 6:
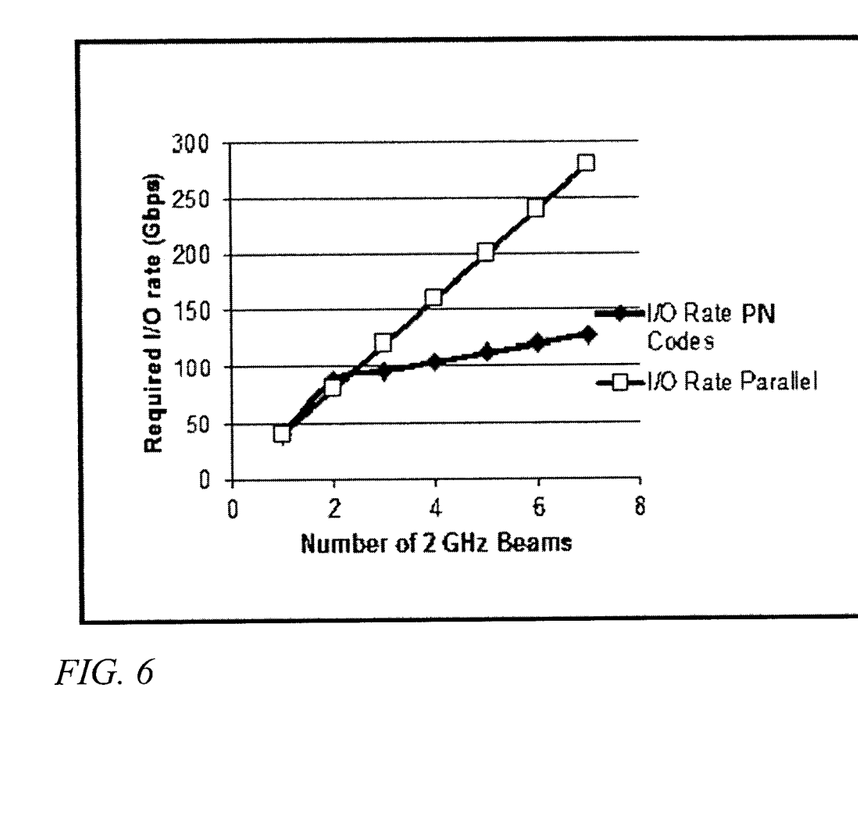
FIG. 6 is a graph showing a reduction in total data rate according to an embodiment of the present invention.

FIG. 6 shows the benefits of using encoding prior to A/D conversion. In one embodiment, the total data rate required increases linearly with the number of beams if a separate A/D converter is used for each beam, as illustrated by the curve labelled "I/O Rate Parallel". If a single A/D converter is used to convert the data from all of the beams after encoding and adding the analog data according to an embodiment of the present invention, then the data rate increases as additional channels are added because an A/D converter with higher dynamic range (an A/D converter with a larger number of bits) is used, but the data rate increases significantly more slowly than if additional A/D converters are used, as illustrated by the curve labelled "I/O Rate PN Codes".

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the term "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items means at least half of the items.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of present invention." Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

Although limited embodiments of a method and circuits for converting analog signals to digital signals have been specifically described and illustrated herein, many modifications and variations will be apparent to those skilled in the art. Accordingly, it is to be understood that a method and circuits for converting analog signals to digital signals employed according to principles of this invention may be embodied other than as specifically described herein. The invention is also defined in the following claims, and equivalents thereof.

What is claimed is:

1. A system for processing a plurality of analog signals, the system comprising:
   a code generator comprising a plurality of serial digital code outputs, the code generator configured to produce, at the plurality of code outputs, a plurality of orthogonal binary codes, each of the plurality of orthogonal binary codes corresponding to one of the analog signals;
   a plurality of encoders, each encoder comprising:
      an analog encoder input connected to receive an analog signal of the plurality of analog signals;
      a digital encoder input configured to receive a binary encoder input signal, the digital input connected to a code output of the code generator;
      an analog encoder output for transmitting an analog encoder output signal; and
      a circuit configured to generate the analog encoder output signal by:

multiplying the analog signal received at the analog encoder input by a first analog value when the binary encoder input signal has a first digital value, and multiplying the analog signal received at the analog encoder input by a second analog value when the binary encoder input signal has a second digital value; and a summing node having a plurality of analog summing inputs and an analog sum output, each analog summing input connected to the analog encoder output of an encoder of the plurality of encoders, and the summing node configured to produce a signal, at the analog sum output, equal to the sum of the signals at the analog summing inputs.

2. The system of claim 1, further comprising:

an analog to digital converter (ADC) comprising an analog ADC input connected to the analog sum output and a digital ADC output; and a decoder, comprising a digital decoder input connected to the digital ADC output and a plurality of digital decoder outputs, a first decoder output of the plurality of decoder outputs configured to produce a first decoder output signal, the first decoder output signal being a correlation between the signal at the digital decoder input and a first binary code of the plurality of orthogonal binary codes.

3. The system of claim 2, further comprising a beam former having a plurality of analog inputs and an analog output, the analog output being connected to an analog encoder input, the beam former being configured to generate, at the analog output, a signal equal to a linear combination of the signals at the analog inputs of the beam former.

4. The system of claim 3, wherein the beam former comprises a plurality of multiplying digital to analog converters.

5. The system of claim 3, wherein the beam former comprises a plurality of floating gate metal oxide semiconductor transistors.

6. The system of claim 3, further comprising an analog sample and hold circuit having an analog input and an analog output, the analog output of the analog sample and hold circuit being connected to an analog input of the plurality of analog inputs of the beam former.

7. The system of claim 6, further comprising a down-converter having an RF input and an IF output, the IF output being connected to the analog input of the analog sample and hold circuit.

8. The system of claim 7, further comprising an antenna element having an RF output, the RF output of the antenna element being connected to the RF input of the down-converter.

9. The system of claim 6, wherein the analog sample and hold is configured to operate at a first sampling rate, and the code generator is configured to operate at a second sampling rate, the second sampling rate being greater than the first sampling rate.

10. The system of claim 9, wherein a ratio of the second sampling rate to the first sampling rate is equal to the number of encoders in the plurality of encoders.

11. The system of claim 2, wherein the code generator comprises a linear feedback shift register.

12. The system of claim 2, wherein the code generator comprises a memory, the memory storing a plurality of codes.

13. The system of claim 2, wherein the decoder is configured to form the correlation between the signal at the digital decoder input and the first binary code by multiplying the signal at the digital decoder input by the binary code to produce a digital multiplier output stream.

14. The system of claim 13, wherein the decoder is configured to form the correlation between the signal at the digital decoder input and the first binary code by further processing the digital multiplier output stream with a filter.

15. The system of claim 14, wherein the filter is a moving average filter.

16. The system of claim 15, wherein the moving average filter is configured to average a number of points, the number of points being equal to the number of encoders in the plurality of encoders.

17. The system of claim 2, wherein the first analog value is 0 and the second analog value is 1.

18. The system of claim 2, wherein the first analog value is −1 and the second analog value is 1.

* * * * *